Figure 1:
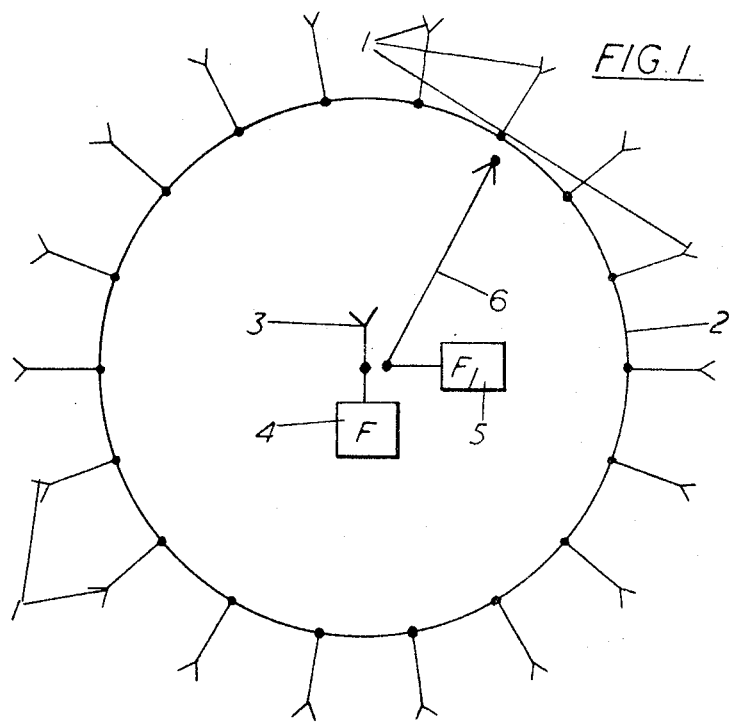

Nov. 22, 1966  C. W. EARP  3,287,727
HARMONIC PHASE COMPARISON DIRECTION DETERMINATION SYSTEM
Filed Nov. 19, 1963  3 Sheets-Sheet 1

Inventor
CHARLES W. EARP
By *Percy P. Lantzy*
Attorney

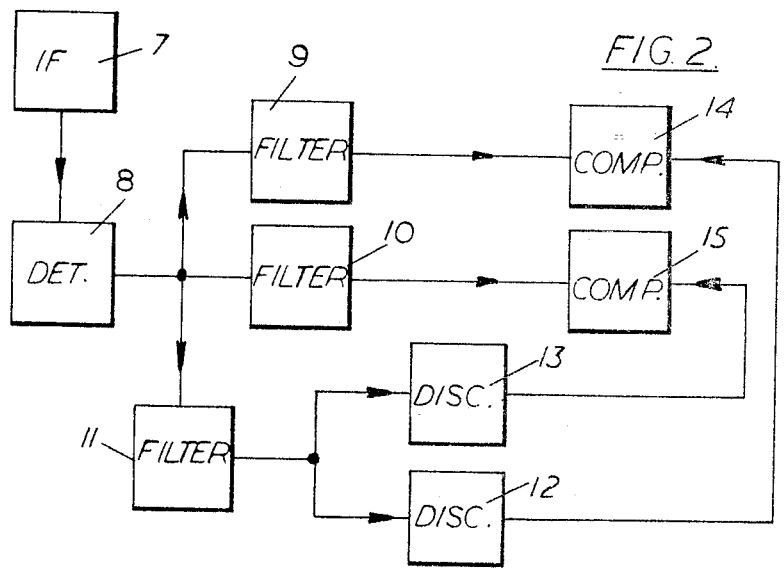
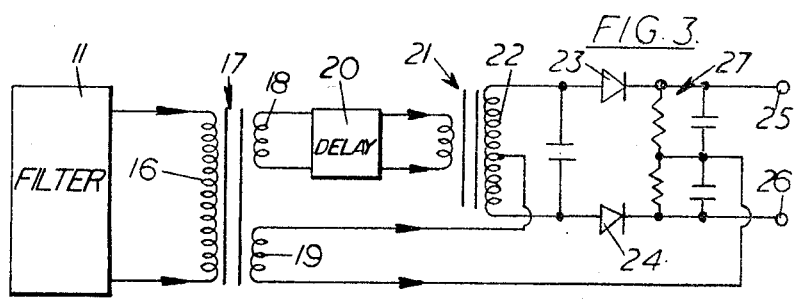
Inventor
CHARLES W. EARP

Nov. 22, 1966  C. W. EARP  3,287,727
HARMONIC PHASE COMPARISON DIRECTION DETERMINATION SYSTEM
Filed Nov. 19, 1963  3 Sheets-Sheet 3
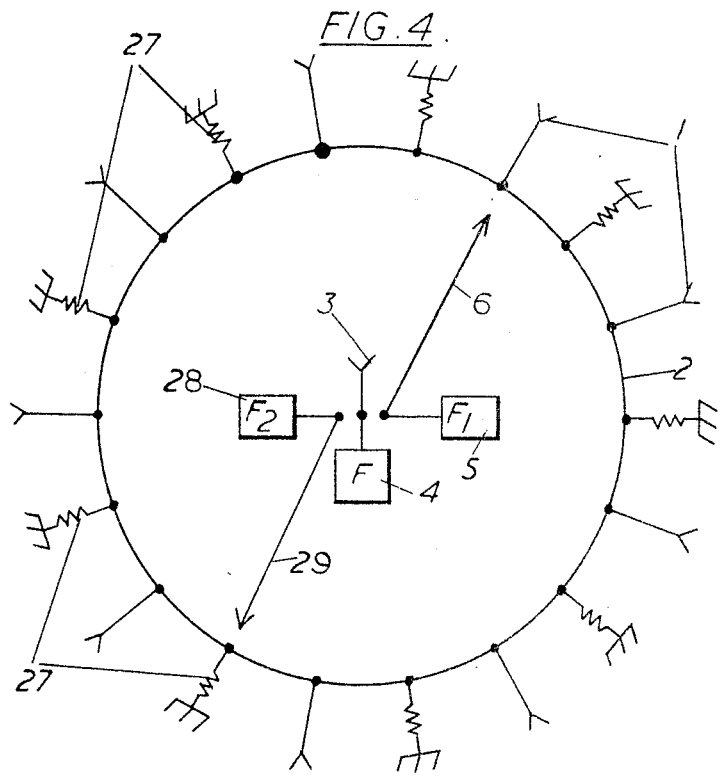
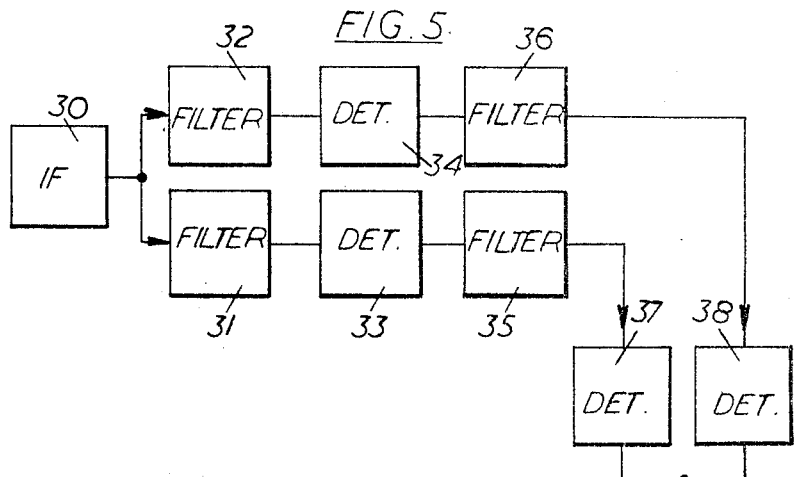
Inventor
CHARLES W. EARP
By
Attorney

United States Patent Office

3,287,727
Patented Nov. 22, 1966

3,287,727
HARMONIC PHASE COMPARISON DIRECTION DETERMINATION SYSTEM
Charles William Earp, London, England, assignor to International Standard Electric Corporation, New York, N.Y., a corporation of Delaware
Filed Nov. 19, 1963, Ser. No. 324,794
Claims priority, application Great Britain, Nov. 29, 1962, 45,113/62
3 Claims. (Cl. 343—106)

This invention relates to radio navigation systems in which a direction-dependent signal is compared in phase with a reference signal to determine a direction, and to receiver equipment for such systems.

A more accurate phase comparison indication, and hence direction determination, is obtainable by additionally performing a phase comparison on harmonics of the two signals. The phase comparison of the fundamental signals needs then be sufficiently accurate only to resolve the ambiguity inherent in phase comparison of harmonic signals.

Although the two fundamental signals have the same frequency, the harmonic signals may have different frequencies.

According to one aspect of the invention, there is provided a radio navigation system having means at a receiver station to compare in phase a direction-dependent signal with a reference signal to determine the direction from a transmitter station, including means at the receiver station to compare a harmonic of the direction-dependent signal with a harmonic of the reference signal, the latter harmonic being an exact multiple of the former harmonic, for a more accurate direction determination.

According to another aspect of the invention, there is provided radio receiver equipment having means to compare in phase a direction-dependent signal with a reference signal to determine the direction from a transmitter station, and means to compare a harmonic of the direction dependent signal with a harmonic of the reference signal, the latter harmonic being an exact multiple of the former harmonic, for a more accurate direction determination.

Embodiments of the invention will now be described with reference to the accompanying diagrammatic drawings in which:

FIG. 1 shows a circular antenna arrangement;
FIG. 2 shows a block schematic of a receiving arrangement;
FIG. 3 shows a detail circuit of a part of the arrangement of FIG. 2;
FIG. 4 shows a further circular antenna arrangement; and
FIG. 5 shows a detail of receiver equipment for separating a harmonic reference signal.

The arrangement of FIG. 1 has eighteen antennas 1 equispaced on a circle 2, at the centre of which is a further antenna 3. The central antenna 3 is connected to the output of a transmitter 4 of frequency F and the antennas 1 are coupled in turn to the output of a transmitter 5 via an electronic distributor symbolized by a rotor arm 6. The output of the transmitter 4 is a wave of frequency F amplitude-modulated by reference signals phase-synchronized with the coupling cycle of the antennas 1, and the output of the transmitter 5 is a continuous wave of frequency $F_1$.

In operation the antennas 1 are energized singly and sequentially around the circle 2, and so there is simulated a source of radiations of frequency $F_1$, moving around the circle 2. Consequent to the simulated movement the resulting transmissions received at a distant point carry a frequency modulation due to the Doppler effect.

The frequency F at which the further antenna 3 is energized by the transmitter 4 is displaced by 9960 c./s. from the frequency $F_1$. The value of the frequency displacement is arbitrary except that it should be small compared with the transmission frequency of the antennas, usually in the VHF band, and large compared with the frequency of revolutions of the rotor arm 6, which is 30 c./s. in this embodiment.

The coupling cycle of the antennas 1 to the transmitter 5, and the AM on the transmission from 4 have a frequency of 30 c./s.

Superimposed on the amplitude modulation is a further amplitude modulation which is the sixth harmonic of the reference signal and phase-related to it.

The signal transmitted from the antenna 3 thus carries an amplitude modulation of 30 cycles per second, and a further AM at 180 c./s., both being synchronized with the 30 c./s. rotation of the imaginary rotor arm 6.

The phase of the FM resulting from the rotation depends at any instant on the direction from which the signal is received, and it is thus direction-dependent, while the phases of the reference signal and of the harmonic reference signal depend only on the rotational phase of the rotor 6. Phase comparison at a receiver station between the AM reference signal and the FM signal gives an indication of the direction of the transmitter antennas 1 and 3 from the receiver station. If the third harmonic of the received FM signal is extracted from or generated at the receiver station and compared with the harmonic reference signal, phase comparison can be made more accurately but ambiguously. Therefore simultaneous phase comparison between the two harmonic signals and between the two fundamental signals is necessary to give both increased accuracy and unambiguity.

FIGS. 2 and 3 show receiver equipment to perform these functions.

Referring to FIG. 2, at a distant receiver station the waves from the antennas 1 and the antenna 3 are picked up and fed together via various amplifying stages to an AM detector. FIG. 2 shows the last IF stage 7 feeding an AM detector 8. Three filters 9, 10 and 11 tuned to 30 c./s., 180 c./s. and 9960 c./s. respectively are coupled to the output of the detector 8. The output of the filter 11 is coupled both to an ordinary FM discriminator 12 and to a harmonic FM discriminator 13, which will be described in detail later. The outputs of the filter 9 and the ordinary FM discriminator 12 are connected to the two inputs of a first phase comparator 14 for phase comparison, while the outputs of filter 10 and of the harmonic phase discriminator 13 are connected to respective inputs of the phase comparator 15.

The function of the filters 9 and 10 is to isolate the fundamental and harmonic reference signals respectively which were present as amplitude modulations on the wave of frequency F originating from the antenna 3. The filter 11 operates to isolate the beat wave caused by feeding the waves from the antennas 3 and the antenna 1 together to the AM detector 8. The beat wave has a frequency of $|F-F_1|$ or 9960 c./s. and carries an FM due to the Doppler effect at 30 c./s. repetition rate, i.e. at the repetition frequency of the coupling cycle of the antennas 1. The fundamental FM discriminator derives the 30 c./s. component of the FM and the harmonic discriminator extracts the third harmonic of the FM at 90 c./s.

The 30 c./s. outputs from the filter 9 and the discriminator 12 are compared in phase in the phase comparator 14 to give an unambiguous direction determination, and the 180 c./s. output from the filter 10 is compared in phase with the 90 c./s. output from the discriminator 13 in the second phase comparator 15 to give a more accurate, although ambiguous, direction determination. The comparators 14 and 15 are coupled together (not shown) so that 15 is not operative until the comparator 14 gives its indication.

Thus the 90 c./s. direction-dependent harmonic is generated in response to the frequency modulated 9960 c./s. signal in the receiver, while the 180 c./s. reference harmonic is transmitted as an amplitude modulation and isolated in the receiver.

It is within the scope of the invention to generate the reference harmonic in the receiver in response to the received fundamental reference signal. This will give improved accuracy only in so far as phase resolution by the phase comparator may be more certain.

It is also within the scope of the invention to have the circular array of successively coupled antennas 1 at the receiver end, and to pick up a single unmodulated transmitted wave on both the antennas 1 and a single further antenna, the wave picked up on the further antenna being frequency-changed by 9960 c./s. and being passed through the same receiver on to the AM detector 8. The receiving equipment has means to generate fundamental and harmonic reference signals synchronized with the coupling cycle, and the two phase comparisons are performed as described previously.

FIG. 3 shows in more detail the harmonic discriminator 13 of FIG. 2.

The detected 9960 c./s. frequency-modulated signal from filter 11 (FIG. 2) is fed to the primary winding 16 of a transformer 17 having two secondary windings 18 and 19. The secondary 18 is connected through a delay network 20 to the primary winding of a differential transformer 21, the secondary winding 22 of which is connected through rectifiers 23 and 24 to respective output terminals 25 and 26. The output terminals are shunted by a complex impedance 27, of which the centre point is connected to one end of the secondary 19, and the other end of the secondary 19 is connected to the centrepoint of the secondary 22 of the transformer 21.

The output of the circuit is comprised of harmonics of the 30 c./s. F.M. input, and a particular hormonic can be made to predominate by the following procedure.

(1) Odd harmonics only, are contained in the output when phasing of the two inputs to the sum and difference detector are in quadrature, the 9960 c./s. signal being unmodulated.

(2) Even harmonics only, are contained in the output when phasing of the two inputs is 0° or 180°.

(3) A particular harmonic is made to predominate by choice of the amount of delay.

For example, the third harmonic has a maximum value when under the condition of maximum frequency deviation from 9960 c./s. this frequency displacement produces an additional phase displacement between inputs to the sum and difference detector, of about 4 radians.

If adjacent aerials are apaced by λ/3 (or 120°), this means that the delay must be equal to the time taken to commutate through two aerial positions, corresponding to phase difference of 240° or 4 radians.

In the case of 18 aerials spaced at intervals of λ/3 (120°), the delay time =1/30×2/18 second, say 3.7 millisecs.

In the more practical case of 50 aerials, the delay would be 1/30×2/50 second, = 1⅓ millisec.

Maximum 5th harmonic, which corresponds to maximum differential phase values of about $2\pi$ radians, involves the use of a delay of 2 milliseconds (for 50 aerials).

A further embodiment will now be described in which both the reference and the harmonic reference signals originate at the transmitter end, but the harmonic reference is contained in the direction-dependent signal.

Referring to FIG. 4 the antenna layout differs from that of FIG. 1 in that alternate antennas 1 in the circle 2 have been replaced by matched loads 27 and in that an extra transmitter 28 is provide, of frequency $F_2$ differing from F by 9960 c./s. and from $F_1$ by 2×9960 or 19,920 c./s. The transmitter 5 is adapted for coupling to the antenna and matched loads in turn around the circle 2, and the transmitter 28 is similarly adapted by means of another electronic distributor symbolized by the moving arm 29 for sequential coupling. The elements coupled to the transmitters 5 and 28 are always diametrically opposite on the circle 2. Since the array contains an odd number of antennas 1 and a similar number of matched loads 27, two antennas 1 are never simultaneously energized. In fact the antennas 1 are energized by the transmitter 5 in the intervals between the energization of antennas by the transmitter 28. It is preferable for the waves from the transmitters 5 and 28 to be in sideband phase relationship as well as frequency relationship with the wave from the transmitter 4. Thus they are conveniently actually generated sidebands from the transmitter 4.

Because the frequencies of the transmitters 5 and 28 are spaced symmetrically about the frequency of the transmitter 4 by 9960 c./s., the waves transmitted from the array are continually varying in frequency in steps of 19,920 c./s. at a repetition rate of 270 c./s.

These frequency variations thus cause the transmitted signal to have a 270 c./s. component signal synchronized with the rotation, and hence it serves as the harmonic reference wave. The 30 c./s. fundamental reference signal is transmitted as described for FIG. 1, as an AM from the antenna 3.

The received arrangement is identical with that shown in FIG. 2 for cooperation with the transmitting arrangement shown in FIG. 1.

The matched loads 27 are convenient means to dissipate the power from the transmitters $F_1$ and $F_2$ when they are not energizing the antennas. It is within the scope of the invention and more economical in power, to arrange that the transmitters be immobilized instead of dissipating their power thus, or in any other way be prevented from energizing any antenna 1.

It is anticipated that an analogous transmitting antenna arrangement having 25 antennas equispaced on a circle of five operating wavelengths diameter, would be of more practical utility, and the embodiment with nine antennas was described for simplicity. The 25 antennas would be alternated with 25 matched loads around the circle 2, and the reference harmonic contained in the direction-dependent signal is then the 25th. At the receiver end, a fifth harmonic of the direction dependent signal is extracted from the harmonic discriminator 13 (FIG. 2) and compared with the 25th reference harmonic for a more accurate direction indication.

FIG. 5 shows a receiving arrangement for extracting a twenty-fifth harmonic reference signal resulting from such a switching cycle at the cooperating transmitter as described above.

The input wave is converted to an I.F. frequency of, for example 5 mc./sec., and from an I.F. stage 30 is passed to the inputs of a pair of filters 31 and 32 which are tuned about 20 kc./c. in opposite senses from the I.F. frequency. The outputs of the filters 31 and 32 are A.M. detected in detectors 33 and 34, to yield 9960 c./s. outputs each amplitude modulated at 750 c./s.

The outputs of filters 35 and 36, each tuned to 9960 c./s., are A.M. detected in dectors 37 and 38, each yielding 750 c./s. outputs. These 750 c./s. outputs from detectors 37 and 38 are combined in-phase in a common load, and if necessary filtered to provide the required 750 c./s. harmonic reference signal.

Other methods of isolating the reference harmonic will occur to those skilled in the art.

It is also within the scope of the invention to generate the 25th reference harmonic by means other than using the switching rhythm of the coupling cycle, for instance it may be transmitted as an amplitude modulation, either together with the fundamental reference wave as described for FIG. 1, or from a separate antenna.

The receiver equipment for isolating the fundamental reference and direction-dependent signals and the harmonic reference signal is the same as that shown in FIGS. 2 and 3.

Althous the switching of successive antennas 1 in FIGS. 1 and 4 is electronic, it may be inductive, capacitive or mechanical; variations in the actual timing of the switching in FIG. 4 will cause variations in the content of the harmonic reference signal. For this reason, there may be a very short overlap when signals of frequency $F_1$ and $F_2$ are simultaneously transmitted.

It is to be understood that the foregoing description of specific examples of this invention is not to be considered as a limitation on its scope.

What I claim is:

1. Radio navigation system operative by the Doppler principle having means at a receiver station to compare in phase a direction-dependent signal with a reference signal to determine the direction from a transmitter station, including, in order to obtain a more accurate direction determination, means at the receiver station to compare a harmonic of the direction-dependent signal with a harmonic of the reference signal, the latter harmonic being an exact multiple of the former harmonic, further including at a transmitter station of ring of antennas energized by a first transmitter and a second transmitter, said ring having an odd number of antennas occupying alternate ones of twice that number of equally spaced positions on the ring, the energizing of the antennas by said first transmitter being in order around the circle except that when the coupling cycle reaches a position unoccupied by an antenna the antenna diametrically opposite the unoccupied position is energized by said second transmitter, successive such transitions of the coupling cycle from an unoccupied position to an opposite antenna initiating the said harmonic reference signal, and means to couple successively the antennas, to equipment to simulate a rotation of an antenna the direction-dependent signal being a frequency modulation caused by the simulated rotation, and the reference signal an amplitude modulation phase-related to said simulated rotation.

2. System according to claim 1 in which there are 25 transmitting antennas occupying alternate ones of 50 equispaced positions on the circle, and means to couple successively the antennas to said first transmitter to simulate a rotation means to couple successively the antennas to said second transmitter to simulate a rotation, the simulated rotations being 180° out of phase on the circle, and means to radiate a wave at a frequency midway between the frequencies of the first and second transmitters.

3. Receiver equipment for a system according to claim 1 to recover a reference harmonic signal including a pair of filters coupled to an IF stage and detuned equally one one each side of the IF frequency by a small amount, means to detect a beat wave from the outputs of both filters and means to detect an AM on the two beat waves, the AM being the desired harmonic reference.

References Cited by the Examiner

UNITED STATES PATENTS

| 2,753,554 | 7/1956 | Adams et al. | 343—106 |
| 3,004,256 | 10/1961 | Parker | 343—106 |
| 3,173,140 | 3/1965 | Hansel | 343—106 |
| 3,181,159 | 4/1965 | Kramar et al. | 343—106 |

FOREIGN PATENTS

| 695,085 | 8/1953 | Great Britain. |

CHESTER L. JUSTUS, *Primary Examiner.*

H. C. WAMSLEY, *Assistant Examiner.*